United States Patent [19]

Lemieux

[11] Patent Number: 4,852,937

[45] Date of Patent: Aug. 1, 1989

[54] COMMON GROOVED AND SLOTTED STRUCTURAL MEMBERS FOR A TRUCK BODY

[75] Inventor: Michael J. Lemieux, Ocala, Fla.

[73] Assignee: American Eagle Fire Apparatus Co., Inc., Gainesville, Fla.

[21] Appl. No.: 8,345

[22] Filed: Jan. 29, 1987

[51] Int. Cl.$^4$ .................................... B60R 29/00
[52] U.S. Cl. ...................... 296/183; 296/29; 52/732
[58] Field of Search ............ 296/191, 183, 187, 205, 296/193–198, 29; 52/732, 730

[56] References Cited

U.S. PATENT DOCUMENTS

| | | | |
|---|---|---|---|
| Des. 134,127 | 10/1942 | Aker | D12/13 |
| 3,187,710 | 6/1965 | Wilfert | 160/28 R |
| 3,405,898 | 10/1968 | Ringle | 362/82 |
| 3,557,514 | 1/1971 | Fahrni | 52/730 |
| 3,566,561 | 3/1971 | Tozer | 52/127.1 |
| 3,599,722 | 8/1971 | Davidson | 169/24 |
| 3,675,721 | 7/1972 | Davidson et al. | 169/24 |
| 3,710,096 | 1/1973 | McFarlin | 248/27.1 |
| 3,746,362 | 7/1973 | Schittenhelm | 280/789 |
| 3,772,994 | 11/1973 | Juarke | 104/140 |
| 4,042,275 | 8/1977 | Glassmeyer et al. | 296/183 |
| 4,110,942 | 9/1978 | Slocomb, Jr. | 52/730 |
| 4,251,103 | 2/1981 | Nakajima et al. | 296/195 |
| 4,395,080 | 7/1983 | Winn et al. | 52/732 |
| 4,408,922 | 10/1983 | D'Alessio | 403/12 |
| 4,432,179 | 2/1984 | Bachmann | 52/732 |

FOREIGN PATENT DOCUMENTS

| | | | |
|---|---|---|---|
| 3529662 | 2/1987 | Fed. Rep. of Germany | 296/191 |
| 1106734 | 12/1955 | France | 52/732 |

OTHER PUBLICATIONS

Sketches of fire truck structural extrusions manufactured by Emergency One, sketches prepared by Michael J. Lemieux on 12/14/86.

Primary Examiner—Johnny D. Cherry
Assistant Examiner—Joseph D. Pape

[57] ABSTRACT

A common structural member for use at several locations within a truck body is comprised of an elongated member having a uniform cross-section. The common structural member has a flat surface with stiffening ribs and a first pair of mutually parallel walls along its longitudinal edges. A longitudinal T-slot extends along a first one of the parallel walls, while a longitudinal first groove extends along the second one of the walls. A longitudinal notch or second groove is situated at the second wall, and one of the notch or grooves is arranged at right angles to the T-slot while the other of the notch or grooves is arranged parallel to the T-slot. Each of the notch and grooves is adapted to accept a sheet metal panel therein. The T-slot comprises an inset channel, a slot perpendicularly intersecting said channel, and a recess opposing the slot. The T-slot further comprises at least one enlarged aperture adapted to accept a bolt or a nut therethrough for insertion into the T-slot recessed channel. In another embodiment, the common member further comprises a second pair of mutually parallel walls joined perpendicularly to the first pair of mutually parallel walls, thereby forming four longitudinal edges. Either a T-slot or a groove is situated at each of the longitudinal edges, with each of the T-slot or grooves having a particular orientation, relative to each other, such that the common member can be used at several locations throughout a truck body.

21 Claims, 5 Drawing Sheets

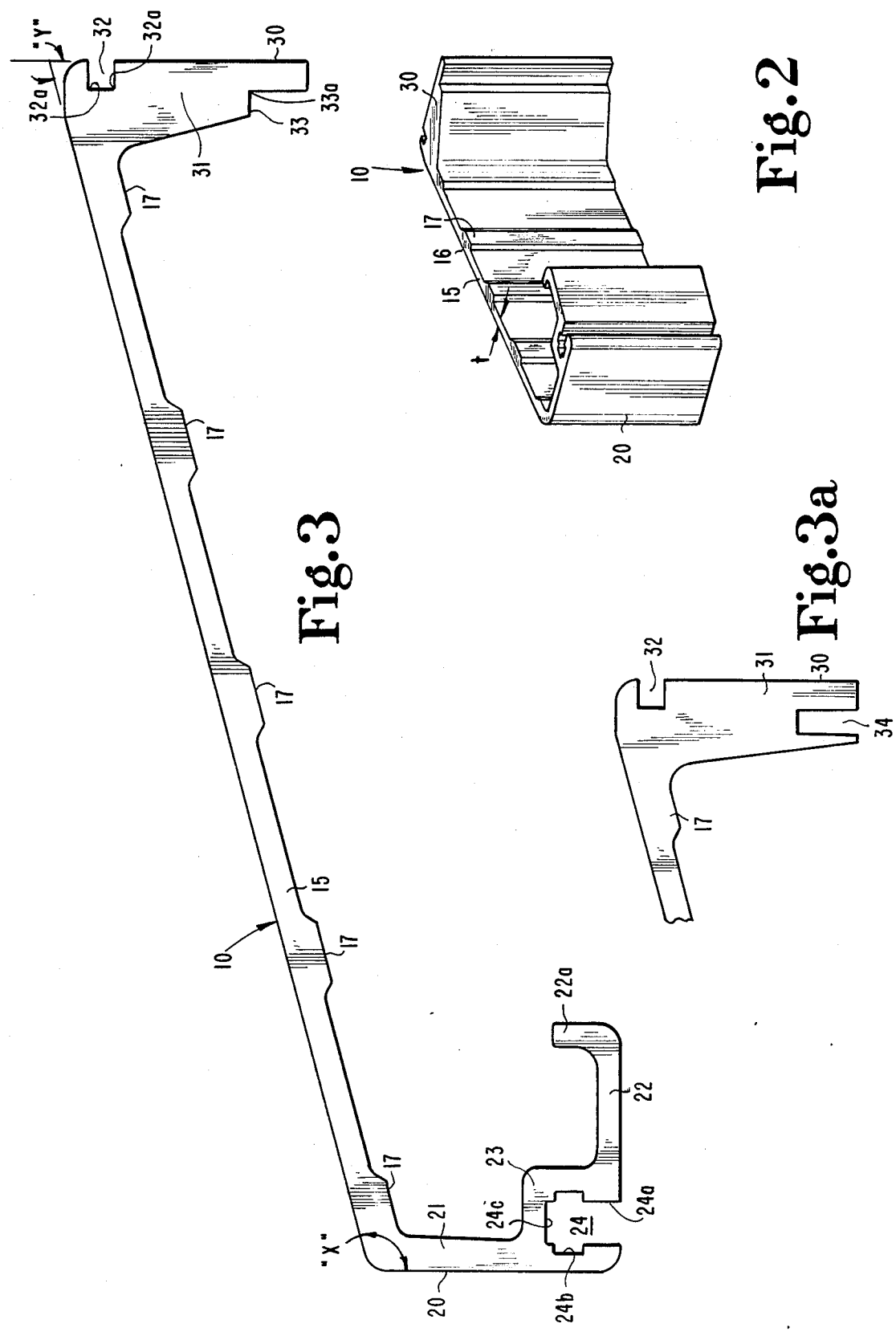

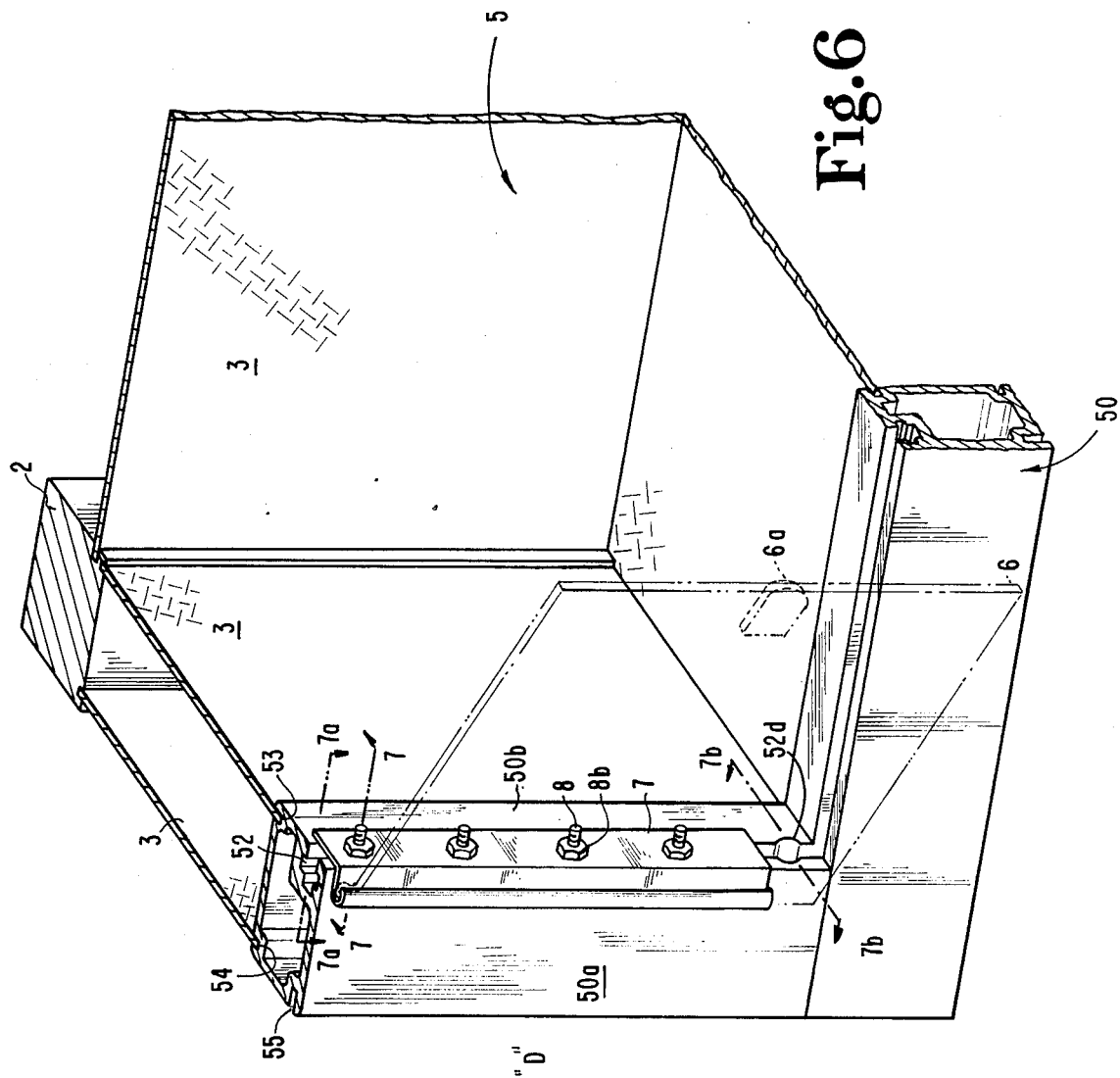

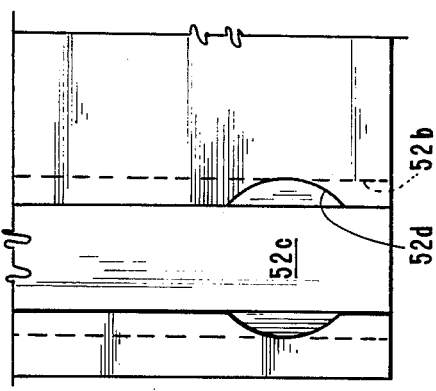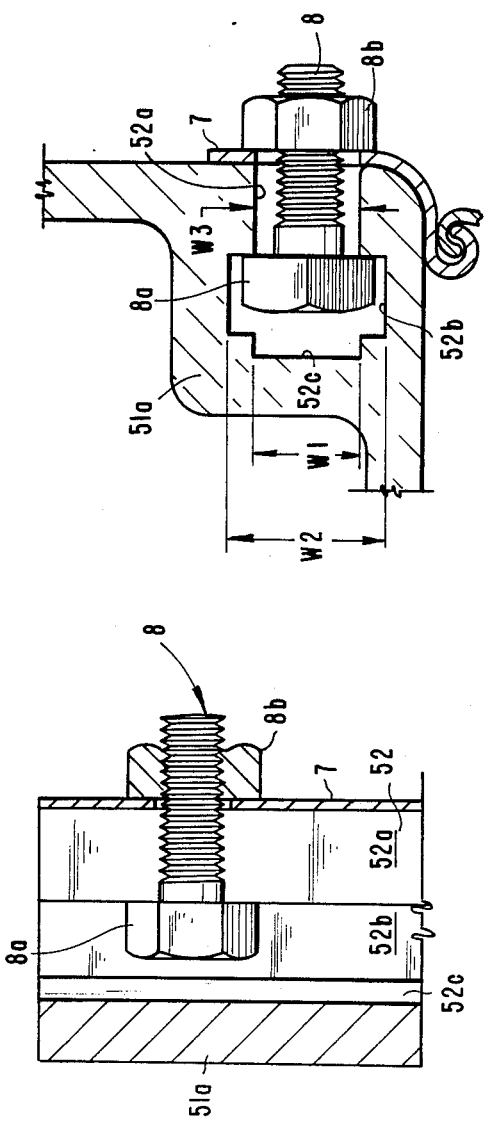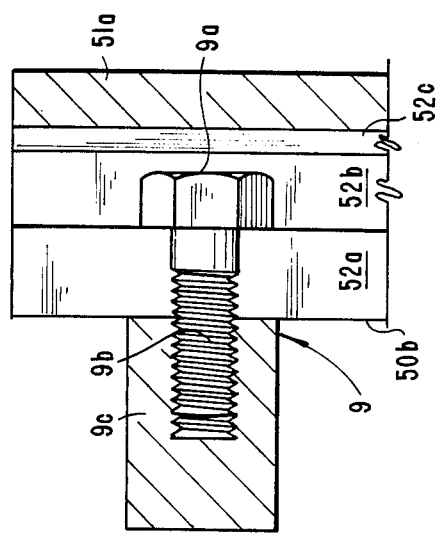

COMMON GROOVED AND SLOTTED STRUCTURAL MEMBERS FOR A TRUCK BODY

BACKGROUND OF THE INVENTION

1. Field of the Invention

This invention relates to the field of truck body structural members, and particularly to fire truck bodies. The present invention includes common structural members for use at several locations in a truck body.

2. Description of the Prior Art

Common structural members are used in many fields for many devices and products. In several applications, these common structural members are grooved or T-slotted, such as the channelled structural members of Tozer, U.S. Pat. No. 3,566,561. Tozer discloses a slotted member for use in the construction of display stands. The commonality of this slotted member allows a plurality of such members to be assembled in an infinite variety of configurations.

One use of channelled structural members in vehicle bodies is disclosed in Schittenhelm, U.S. Pat. No. 3,746,362. The channeled member is included in Schittenhelm for its structural integrity, rather than for its independent functional significance. Further, the Schittenhelm structural member is not adapted to be a common piece for use throughout a vehicle body.

The coupler of D'Alessio, U.S. Pat. No. 4,408,922, describes a mounting coupler designed to engage with a T-slot formed in an elongated tube. The coupler comprises a T-bolt and a bracket terminating in a T-portion, each T-section being positioned within the T-slot. The T-portion of the bracket is adapted to cock in the T-slot so that the bracket is held vertically in place until the T-bolt is engaged. D'Alessio demonstrates one functional feature of a T-slot apart from strength considerations, but the device is not addressed to common structural members for truck bodies.

One object of the present invention is to provide a common structural member having grooves and T-slots with functional characteristics independent of any strength or weight reduction aspects. The structural member is adapted for use throughout a vehicle body, such as a side panel support, a taillight mounting surface and a compartment door support frame.

It is an object of this invention to provide a structural member that is easy and economical to manufacture. Another object is to provide common structural members capable of being formed in various lengths, yet having the same cross-sectional design, to facilitate use throughout the vehicle body. Still a further object is to present a common structural member useful in angled portions of a vehicle body. Other objects of the present invention will become obvious from the description of the preferred embodiments.

SUMMARY OF THE INVENTION

A groove and T-slot frame member for truck body construction including an elongated member having a uniform cross-section and a first pair of mutually parallel walls along its longitudinal length, a longitudinal T-slot extending along a first one of said parallel walls and a longitudinal first groove suitable for insertion of a body panel extending along a second one of said walls.

BRIEF DESCRIPTION OF THE DRAWINGS

FIG. 2 is a perspective view of a section of one common structural member.

FIG. 3 is a top view of the common structural member of FIG. 2.

FIG. 3a is a fragmentary view of a portion of the common structural member as shown in FIG. 3.

FIG. 6 is a pictorial view of a portion of a truck body compartment showing the application of one embodiment of the common structural member, with a portion of the fire truck compartment cut-away.

FIG. 7 is a cross-sectional view of the T-slot in FIG. 6, taken at Section 7—7 as viewed in the direction of the arrows.

FIG. 7a is an end view of the cut-away of the fire truck compartment in FIG. 6, taken at Section 7a—7a, as viewed in the direction of the arrows.

FIG. 7b is a frontal view of the enlarged opening in the T-slot in FIG. 6, taken at Section 7b—7b, as viewed in the direction of the arrows.

FIG. 8 is a cross-sectional view of the T-slot as shown in FIG. 7, showing the head portion of a bolt cocked in the T-slot.

FIG. 9 is a cross-sectional view of a T-slot similar to the view in FIG. 7, showing a latching post engaged within the T-slot.

DESCRIPTION OF THE PREFERRED EMBODIMENT

Figure 1:
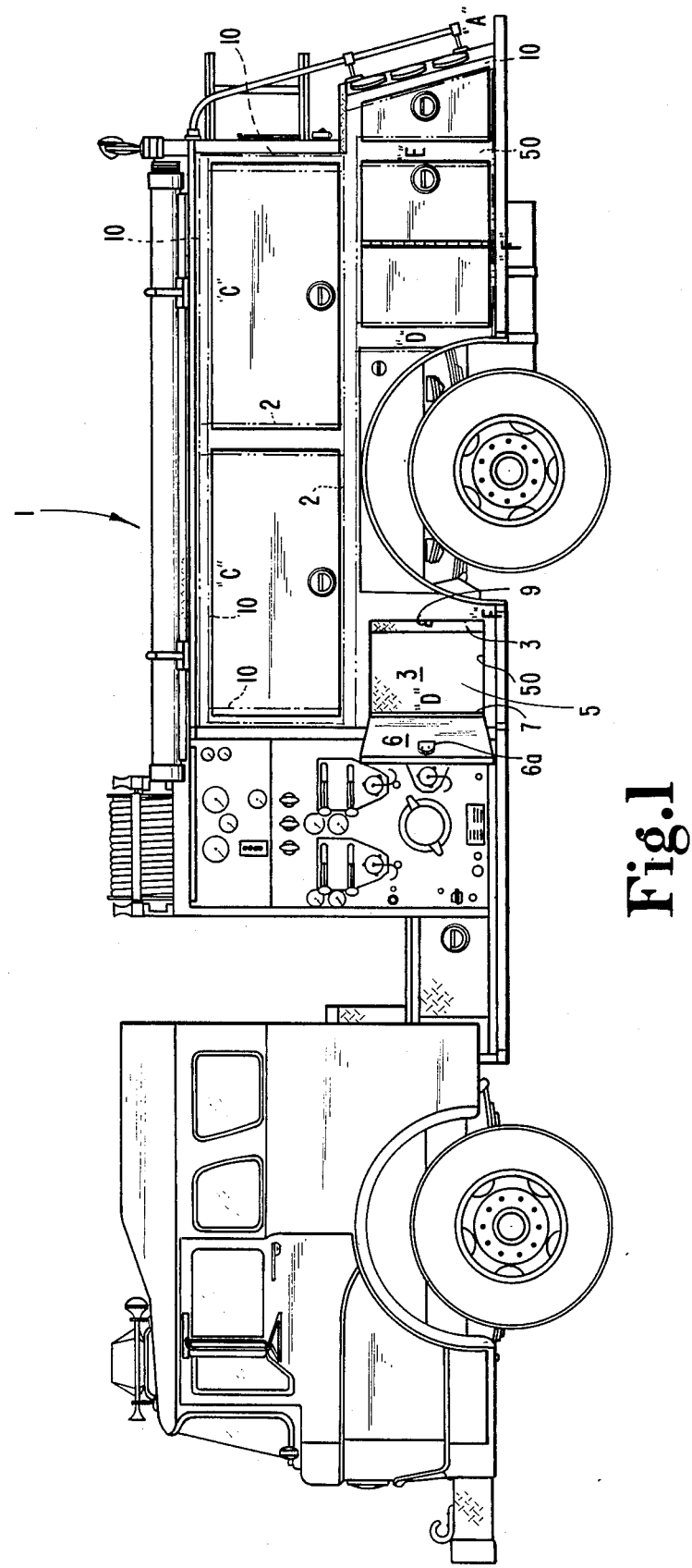
FIG. 1 is a pictorial view of a fire truck showing common structural members at several locations.

For the purposes of promoting an understanding of the principles of the invention, reference will now be made to the embodiments illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a fire truck 1 comprises a plurality of common structural members 10, shown in phantom, of one embodiment of the present invention. The common members 10 are welded to other frame members 2 to form a complete substructure for the fire truck body. The common member 10 is elongated and has a uniform cross-section throughout its length, as illustrated with reference to FIG. 2. The common member 10 comprises a plate 15 having an exposed flat surface 16 and a uniform thickness "t". Longitudinal ribs 17 are added for strength. The flat surface 16 is useful as a mounting surface. Left and right longitudinal flanges 20 and 30, respectively, extend along opposite sides of the plate 15.

The left and right flanges 20 and 30 comprise mutually parallel walls 21 and 31, respectively, shown in FIG. 3. In the present embodiment, the left flange wall 21 forms an obtuse angle "X" with the plate 15, while the right flange wall 31 forms a complementary acute angle "Y". This orientation of walls 21 and 31 relative to plate 15 renders this common member useful at angled portions of a vehicle body, as will be described herein.

The right flange 30 includes groove 32 and notch 33. Alternatively, notch 33 can be replaced by a groove 34, as in the view of a portion of flange 30 in FIG. 3a. Both the groove and the notch are adapted to receive and restrain a sheet metal panel (not shown in the figure) placed therein. The interior corners of the groove and notch, such as corners 32a and 33a, are sharp to conform to and firmly abut the sharp edges of the sheet metal panel to reduce slop in the panel interface. In this embodiment, groove 32 is oriented perpendicular to the wall 31, while the notch 33 is parallel to the same wall.

The left flange 20 includes, in addition to wall 21, a mounting wall 22 extending perpendicularly from the free edge of wall 21, as shown in FIG. 3. For strength or as an additional mounting surface, leg 22a can be added at right angles to the free end of mounting wall 22. A longitudinal boss 23 is formed at the interior corner of the interface between wall 21 and mounting wall 22. A longitudinal T-slot 24 is formed in the boss 23. The T-slot 24 comprises an inset rectangular channel 24b which is perpendicularly intersected by a slot 24a, to create a T-shaped opening. The slot 24a is oriented parallel to wall 21 so that the opening for the T-slot 24 is in the plane of the mounting wall 22. A longitudinal recess 24c opposite the slot 24a is included in the present embodiment.

The particular orientation of T-slot and grooves of the present embodiment is mandated by the design of a particular truck body. It is understood, however, that other orientations or combinations of T-slot(s) and groove(s) are contemplated by applicant's invention, one object of the common structural member being to provide a member adaptable to a variety of truck body designs.

Figure 4:
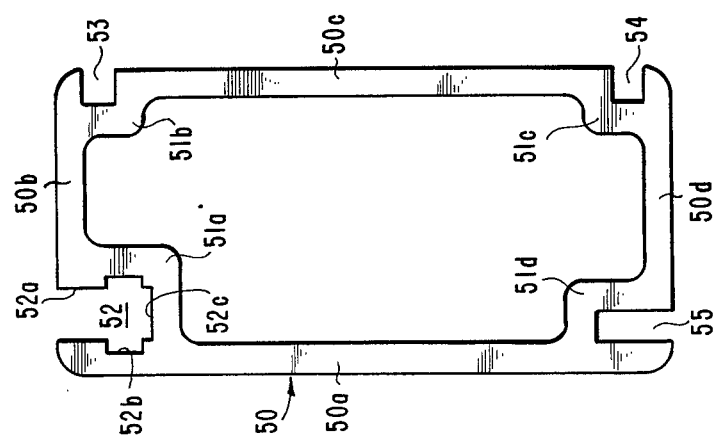
FIG. 4 is a cross-sectional view of a common structural member of another embodiment, taken and viewed as in FIG. 3.

FIG. 4 shows another embodiment of the common structural member of the present invention. While FIG. 4 is a cross-sectional view of the common member 50, it is understood that this member, just as common member 10, is elongated and is adapted for use in the concentration of a vehicle body, such as fire truck 1 in FIG. 1. Common member 50 comprises four walls 50a, 50b, 50c and 50d, arranged to form a hollow rectangular area. Bosses 51a, 51b, 51c and 51d are situated at each of the joints formed between adjoining walls. Either a T-slot or a groove can be formed in each of the bosses, although the common member of this invention comprises at least one T-slot.

In the preferred embodiment, boss 51a includes a T-slot 52, similar in design to the T-slot 24, having a rectangular channel 52b intersected by a slot 52a, and a recess 24c. Grooves 53, 54 and 55 are formed in bosses 51b, 51c and 51d, respectively. In this embodiment, the T-slot 52 and groove 55 are in linear alignment, parallel to wall 50a, and opening outward from the walls 50b and 50d, respectively. Grooves 53 and 54 are mutually parallel and are perpendicular to wall 50a, so that each groove opens outward from wall 50c. The particular orientation of T-slot and grooves of the present embodiment is mandated by the design of a particular truck body. It is understood, however, that other orientations or combinations of T-slot(s) and groove(s) are contemplated by applicant's invention, one object of the common structural member being to provide a member adaptable to a variety of truck body designs.

In a truck, such as fire truck 1 in FIG. 1, the common structural members 10 and 50 can be used throughout the fire truck body as a basic structural member. The common members can be formed of a weldable material so that the members can be joined with each other and with basic vehicle frame members. In applicant's preferred embodiments, the common members are composed of aluminum and formed by an extrusion process. Forming these members by extrusion allows for variable lengths of common members, depending upon the dimensional requirements of a given truck body design. The T-slots and grooves provide ready means for mounting or supporting various parts of a finished vehicle, such as vehicle exterior panels, compartment walls, brackets, support struts and the like. The flat exposed surfaces of the common members provide convenient welding or mounting surfaces.

FIG. 1 shows a particular application of the common structural members of the present invention in the fabrication of a fire truck. Common structural member 10 is used at several locations such as those designated "A" and "C" in FIG. 1, while common structural member 50 is used at locations designated "D", "E" and "F".

Figure 5:
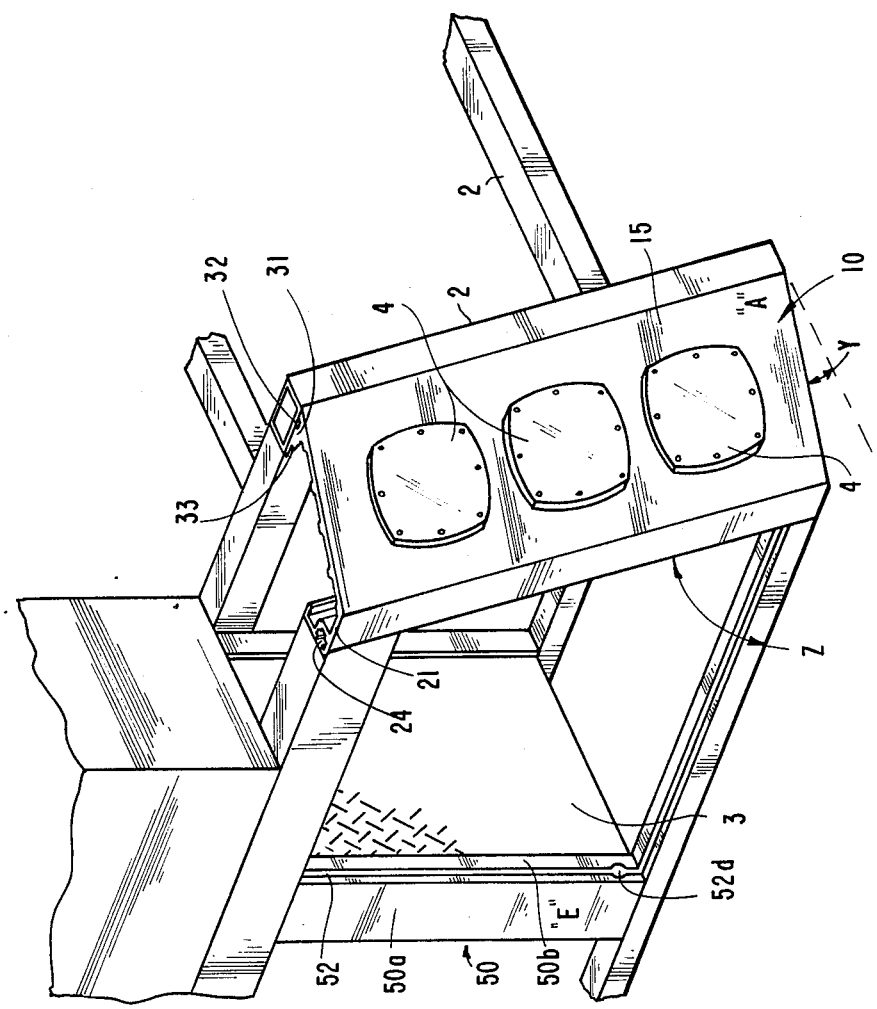
FIG. 5 is a pictorial view of a portion of the rear of a truck body showing application of the common structural members as a taillight mounting surface and as a compartment frame element.

FIG. 5 more clearly illustrates the particular application of common member 10 at an angled portion of the fire truck body at location "A". At this location, common member 10 is adapted for use as a taillight mounting surface. The angular relationships of walls 21 and 31 to the plate 15 permits the plate 15 to have rearward and sideward exposures while the groove 32, notch 33 and the T-slot 24 remain orthogonal to the axes of the truck body. Thus, a taillight assembly 4 mounted on flat surface 16 has the advantage of being visible from both the rear and the side of the fire truck. Rear and side visibility of taillights has obvious and important safety benefits. This application of the common member 10 eliminates the necessity of multiple taillight fixtures or complex taillight lenses found in the prior art. The visibility of the taillight assembly 4 can be further enhanced if the common member 10 is mounted to the truck body at an angle "Z" relative to the horizontal, as illustrated in FIG. 5.

Also shown in FIG. 5 is one application of the common structural member 50 at location "E". Only walls 50a and 50b and T-slot 52 are visible in this view of the assembled fire truck body. Sheet metal panel 3 is engaged within groove 53 of the common member 50, although the groove is not visible in this figure. Panel 3 forms one wall of a storage compartment in this truck body design. Another panel is inserted into groove 54, also not visible, to form the interior wall of an adjacent storage compartment.

The partial cutaway view in FIG. 6 more clearly illustrates the application of common member 50 at location "D" on the truck body, and, in particular, one application of the T-slot 52. At this location, body panels 3 are situated in grooves 53 and 54 to form part of the truck exterior and a portion of the fire truck compartment 5. Groove 55 can be filled to provide a smooth exterior to the vehicle, rather than having an exposed groove. T-slot 52 in common member 50 is oriented, as shown, to open into the truck compartment. A compartment door 6, shown in phantom lines for clarity, is mounted over the compartment 5 by a hinge 7 affixed to the common member 50. In this embodiment, the hinge 7 is affixed to the common member 50 by a plurality of bolts 8. The bolts 8 are engaged within the T-slot 52 as illustrated in FIG. 7. The head portion 8a of the bolts 8 is adapted to slide within channel 52b, consequently the width w1 (shown in FIG. 7a) of head portion 8a is smaller than width w2 of channel 52b. The width w1 of the head portion is larger than the width w3 of slot 52a so that the head portion 8a is retained within the channel 52b. The plurality of bolts 8 can be arranged within the T-slot 52 to coincide with receiving openings in the hinge 7. A nut 8b is threaded onto each bolt and tightened against the hinge, to hold the compartment door 6 in position. The head portion 8a of the bolt can be designed to prevent axial rotation of the bolt within the channel 52b and, therefore, to facilitate tightening the nut 8b onto the bolt. The head portion 8a can be of hexagonal shape such that the width w1 is measured across the flats, while the diagonal measurement across the hexagonal face is greater than width w2 of the channel 52b. A nut dimensionally similar to the head portion 8a can also be accomodated within the channel for use with a separate bolt.

One advantage of the T-slot 52 when used to mount the compartment door hinge, is that the plurality of bolts 8 located within the T-slot can be restrained at their respective locations by gravity. As illustrated in FIG. 8, a bolt 8, engaged within the T-slot, is slightly cocked in the channel 52b by the downward force of gravity. The depth of the channel 52b is adjusted to be slightly larger than the thickness of the head portion 8a to ensure that the head portion contacts the opposite walls of the channel. In this manner, each of the plurality of bolts 8 necessary to attach the hinge can be positioned, and the receiving openings in the hinge aligned accordingly, to facilitate assembly of the compartment door.

A further enhancement to the T-slot of the present invention is indicated in FIGS. 6 and 7b. The longitudinal T-slot 52 includes an enlarged opening 52d at one end of the T-slot. The opening 52d is sufficiently large to accept the head portion 8a of a bolt 8, so that a bolt may be inserted or removed from T-slot 52 once common member 50 is welded in place. A plurality of such openings could be provided at spaced intervals along the T-slot.

Compartment 5 in this application of the present common structural members, includes a common member, situated opposite the common member 50, as illustrated in FIG. 1, with the T-slot in that member also opening into the compartment 5. A latching post 9, affixed to that common member, as shown in FIG. 9, has a relatively enlarged head portion 9a, an externally threaded stem 9b and a relatively enlarged internally threaded bearing portion 9c. The head portion 9a of the latching post functions identically to the head portion 8a of the bolts 8. After the head portion 9a is inserted into the T-slot, the bearing portion 9c is threaded onto the stem 9b. The latching post 9 can be manipulated within the T-slot, until it is aligned with a receiving latch 6a, shown in phantom lines in FIG. 6, on the compartment door 6, and then fixed in position by tightening the bearing portion 9c against the surface of the wall 50b.

While the hinge is affixed using threaded nuts 8b and bolts 8, and the latching post is assembled from a threaded stem 9b and bearing portion 9c, other means of engagement may be utilized, such as a press-fit.

The T-slot in each of the common structural members of applicant's preferred embodiments can be similarly used for mounting or supporting a variety of articles, depending upon the location of the common member within the truck body. The foregoing description demonstrates the versatility of applicant's invention in the assembly of truck bodies. Fabrication of these common members by extrusion is a cost-efficient way to produce structural members specifically adapted to the design requirements throughout the truck body.

The unique arrangement of grooves, T-slots and mounting surfaces allows the common members 10 and 50 to be used at several locations in a truck body. The design of common member 10 is particularly suited for use wherever an angled section is required on a truck body, such as the taillight mounting piece in one application of the present invention. Use of common member 10 as a taillight mounting piece has the beneficial effect of providing side and rear visibility of the taillight, which is a valuable vehicle safety feature.

The foregoing has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle body comprising:
   a vehicle frame having first means for supporting a number of body panels;
   a number of second means, integral with said vehicle frame, for providing angled surfaces in the vehicle body, each of said number of second means including,;
   a one piece elongated member having a uniform cross-section and a first pair of mutually parallel walls along its longitudinal length, a T-slot having a T-shaped cross-section with a T-slot opening extending longitudinally along a first one of said parallel walls, said T-slot being adapted to receive a headed fastener therein, and first panel receiving means suitable for insertion of a body panel comprising a first groove having a first opening extending longitudinally along a second one of said walls;
   said elongated member further including a third wall integral between said first pair of mutually parallel walls to form an open cross-section;
   wherein said first pair of mutually parallel walls are neither parallel nor perpendicular to said third wall; and
   a number of body panels supported by at least one of said first means and said second means.

2. A frame member according to claim 1, wherein said T-slot includes:
   an inset channel; and
   a slot perpendicularly intersecting said channel to form a pair of sharp parallel corners, said slot including said T-slot opening in said first one of said parallel walls,
   wherein said slot further includes at least one enlarged portion through said slot to said inset channel, said opening being adapted to receive a fastener therethrough.

3. A frame member according to claim 2, wherein said slot includes a plurality of enlarged portions spaced along the longitudinal length of said slot.

4. A frame member according to claim 3, wherein said channel includes a longitudinal recess opposing said slot.

5. A groove and T-slot frame member for providing angled surfaces in a truck body construction, comprising:
a one piece elongated member having a uniform cross-section and a first pair of mutually parallel walls along its longitudinal length, a T-slot having a T-shaped cross-section with a T-slot opening extending longitudinally along a first one of said parallel walls, said T-slot being adapted to receive a headed fastener therein, and first panel receiving means suitable for insertion of a body panel comprising a first groove having a first opening extending longitudinally along a second one of said walls;
said elongated member further including a third wall integral between said first pair of mutually parallel walls to form an open cross-section;
wherein said first pair of mutually parallel walls are neither parallel nor perpendicular to said third wall; and
wherein said member includes second panel receiving means suitable for insertion of a body panel situated at said second one of said parallel walls and having a second opening extending longitudinally along said second one of said walls.

6. A frame member according to claim 5, wherein said second panel receiving means is a longitudinal notch with said second opening situated at said second one of said parallel walls distal said third wall.

7. A frame member according to claim 5, wherein one of said first opening of said first groove and said second opening of said second panel receiving means is oriented at a right angle to said T-slot opening.

8. A frame member according to claim 7, wherein the other of said first opening of said first groove and said second opening of said second panel receiving means is oriented parallel to said T-slot opening.

9. A frame member according to claim 5, wherein said member is made of extruded aluminum.

10. A frame member according to claim 5, wherein:
said third wall includes a flat surface and a number of longitudinal stiffening ribs opposite said flat surface.

11. A groove and T-slot frame member for providing angled surfaces in a truck body construction, comprising:
a one piece elongated member having a uniform cross-section and a first pair of mutually parallel walls along its longitudinal length, a T-slot having a T-shaped cross-section with a T-slot opening extending longitudinally along a first one of said parallel walls, said T-slot being adapted to receive a headed fastener therein, said first panel receiving means suitable for insertion of a body panel comprising a first groove having a first opening extending longitudinally along a second one of said walls;
said elongated member further including a third wall integral between said first pair of mutually parallel walls to for an open cross-section;
wherein said first pair of mutually parallel walls are neither parallel nor perpendicular to said third wall; and
wherein said T-slot includes an inset channel and a slot perpendicularly intersecting said channel to form a pair of sharp parallel edges and wherein said inset channel includes a longitudinal recess opposing said slot.

12. A vehicle body comprising:
a vehicle frame;
a number of support means, integral with said vehicle frame, for simultaneously supporting several panels or fixtures in the vehicle body, each of said number of support means including,;
a one piece elongated member having a uniform cross-section and a first pair of mutually parallel walls along its longitudinal length, a T-slot having a T-shaped cross-section with a T-slot opening extending longitudinally along a first one of said parallel walls, said T-slot being adapted to receive a headed fastener therein, and first panel receiving means suitable for insertion of a body panel comprising a first groove in a second one of said walls having a first opening extending longitudinally along said second one of said walls, and a second pair of mutually parallel walls perpendicular to said first pair of parallel walls to form a generally hollow closed cross-section and four longitudinal corners; and
a number of body panels and fixtures supported by said support means.

13. A frame member according to claim 12, wherein said member is made of extruded aluminum.

14. A frame member according to claim 12, wherein:
said first groove is situated at one of said four longitudinal corners; and
said member further comprises a second groove situated at another of said four longitudinal corners and having a second opening extending parallel to said first groove.

15. A frame member according to claim 14, wherein said T-slot is situated at another of said four longitudinal corners and is oriented such that said T-slot opening is at a right angle to each of said first opening of said first groove and said second opening of said second groove.

16. A frame member according to claim 15, wherein said member further comprises a third groove situated at another of said four longitudinal corners and having a third opening oriented at a right angle to each of said first opening of said first groove and said second opening of said second groove.

17. A frame member according to claim 16, wherein said member is made of extruded aluminum.

18. A frame member according to claim 12, wherein said T-slot includes:
an inset channel; and
a slot perpendicularly intersecting said channel to form a pair of sharp parallel corners, said slot including said T-slot opening in said first one of said parallel walls,
wherein said slot further includes at least one enlarged portion through said slot to said inset channel.

19. A frame member according to claim 18, wherein said slot includes a plurality of enlarged portions spaced along the longitudinal length of said slot.

20. A frame member according to claim 19, wherein said channel includes a longitudinal recess opening said slot.

21. A groove and T-slot frame member for simultaneously supporting several panels or fixtures in a truck body construction comprising:
a one piece elongated member having a uniform cross-section and a first pair of mutually parallel walls along its longitudinal length, a T-slot having a T-shaped cross-section with a T-slot opening extending longitudinally along a first one of said parallel walls, said T-slot being adapted to receive a headed fastener therein, and first panel receiving means suitable for insertion of a body panel comprising a first groove in a second one of said walls having a first opening extending longitudinally along said second one of said walls, and a second pair of mutually parallel walls perpendicular to said first pair of parallel walls to form a generally hollow closed cross-section and four longitudinal corners;

wherein said T-slot includes an inset channel and a slot perpendicularly intersecting said channel to form a pair of sharp parallel edges and wherein said inset channel includes a longitudinal recess opposing said slot.

* * * * *

UNITED STATES PATENT AND TRADEMARK OFFICE
CERTIFICATE OF CORRECTION

PATENT NO. : 4,852,937

DATED : August 1, 1989

INVENTOR(S) : Michael J. Lemieux

It is certified that error appears in the above-identified patent and that said Letters Patent is hereby corrected as shown below:

In column 2, line 43, please change "described" to --describe--.
In column 3, line 45, please change "concentration" to --construction--.
In column 7, line 62, please change "for" to --form--.
In column 8, line 62, please change "opening" to --opposing--.

Signed and Sealed this

Twelfth Day of June, 1990

Attest:

HARRY F. MANBECK, JR.

*Attesting Officer*   *Commissioner of Patents and Trademarks*